United States Patent [19]
Francis, Jr.

[11] 4,279,270
[45] Jul. 21, 1981

[54] FLEXIBLE ANTIFREEZE HEATCONDUCTOR LIQUID TRANSFER CONNECTOR HOSE

[75] Inventor: William T. Francis, Jr., 2005A S. Semoran Blvd., Orlando, Fla. 32807

[73] Assignee: William T. Francis, Jr., Spruce Pine, N.C.

[21] Appl. No.: 142,646

[22] Filed: Apr. 22, 1980

[51] Int. Cl.$^3$ .................. F16K 49/00; F16L 53/00; F28F 1/10
[52] U.S. Cl. ............................. 137/340; 138/34; 138/103; 138/111; 165/164; 165/172
[58] Field of Search ............... 138/32, 34, 103, 111, 138/33; 165/164, 172, 185; 137/340

[56] References Cited
U.S. PATENT DOCUMENTS

| | | | |
|---|---|---|---|
| 185,396 | 12/1876 | Haskell | 138/32 |
| 787,356 | 4/1905 | Collins et al. | 138/32 |
| 1,960,866 | 5/1934 | Chadwick | 137/340 |
| 2,446,895 | 8/1948 | Weiss | 137/340 |
| 2,778,609 | 1/1957 | Peeps | 165/172 |
| 2,915,615 | 12/1959 | Leipold et al. | 138/33 |
| 3,151,633 | 10/1964 | Shuman | 138/111 |
| 3,378,673 | 4/1968 | Hopper | 138/33 |

Primary Examiner—Steven L. Stephan

[57] ABSTRACT

This invention constitutes an improvement in a liquid transfer connector hose for the purpose of facilitating an unencumbered transfer of liquids between two points, such as a liquid conductor means of either a permanent or temporary nature, under conditions of below freezing temperature weather conditions, wherein this objective can be attained by having a new composition of components incorporated into the above Flexible Antifreeze Heatconductor Liquid Transfer Connector Hose which components essentially would be primary liquid transfer hose, a suitable heatsource, liquid antifreeze heatconductor hoses, pressure regulator, thermostat, pressure relief valve, pump, reservoir, suitable insulation layer and suitable connector fittings furtherwherein such aforementioned components would be assembled in such a way, as will become evident in the specification, as to make availble a liquid transfer connector hose which between insulation layer and the primary liquid conducting hose has installed a closed loop overlap antifreeze heatconductor hose system of some suitable flexible material, wherein the heatconducting liquid is pumped through aforementioned closed loop in phased circulation subject to the control action of a suitable thermostat the system is equipped with, wherein further this system operates safely and properly by also having built into it a pressure regulator and a pressure relief valve, and a suitable pump together with a suitable heatsource. It is very evident that the thusly described arrangement has definite advantages because it makes possible the transfer of liquids in subfreezing weather for instance in the application of fuel oil transfer in refueling operations in the arctic and other cold regions or the transfer of water in recreational trailer and mobile home parks or the transfer of water for firefighting purposes and so on and so on.

1 Claim, 3 Drawing Figures

FLEXIBLE ANTIFREEZE HEATCONDUCTOR LIQUID TRANSFER CONNECTOR HOSE

DESCRIPTION OF THE DRAWINGS

There are two sheets of drawings.

DETAILED DESCRIPTION

Figure 1:
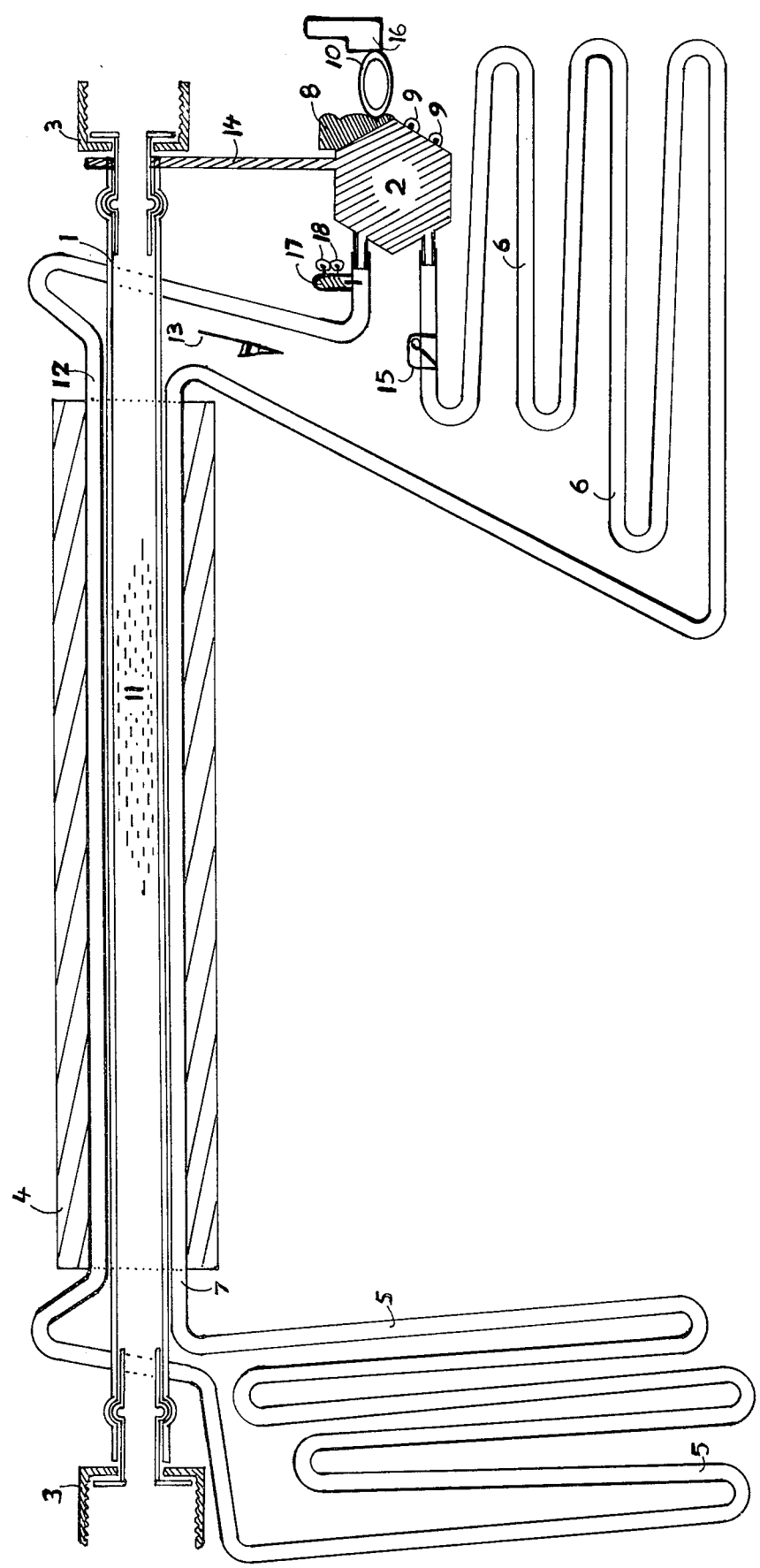
FIG. 1 shows a cross-sectional schematic view through the longitudinal axis of the flexible antifreeze heatconductor liquid transfer connector hose assembly.
Figure 2:
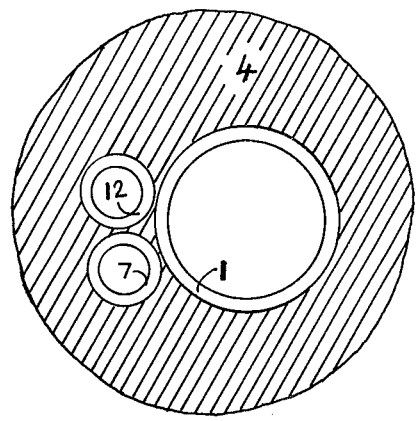
FIG. 2 shows a cross-sectional view of the typical center of said transfer connector hose assembly perpendicularly thereto, wherein aforesaid hose assembly consists of the primary feed fluid carrier hose and the adjoining thereto antifreeze liquid conductor hoses.
Figure 3:
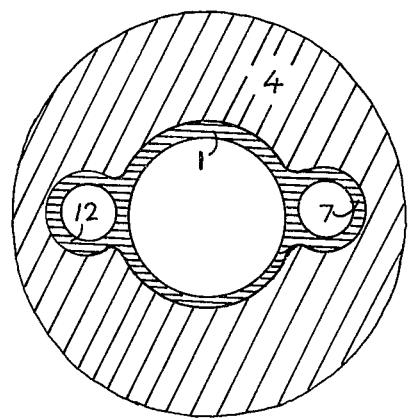
FIG. 3 shows an alternate version of aforesaid assembly wherein the primary feed fluid hose together with the antifreeze liquid conductor hoses is actually a homogeneous unit extruded out of some suitable material.

As can readily be seen in FIG. 1 aforementioned transfer connector hose assembly consists of the main part, primary feed fluid carrier hose 1, attached to which at its respective ends are connector couplings 3. Closely adjoining 1 are antifreeze heatconductor hoses 12 and 7, wherein now it is evident that insulation wrapper 4 encircles and surrounds both 12 and 7 together with 1 producing the effect of a suitable insulation, with antifreeze heat conductor hoses equipped primary feed fluid carrier hose package. 11 denotes primary feed fluid. 13 denotes the direction of flow within the antifreeze heat conductor hose 12 terminating at the suction end of circulating pump 2. 9 are electric terminals for pump 2. 8 is heating element for antifreeze liquid. 10 is pressure relief valve connecting system to overflow resevoir 16. 15 is a checkvalve restricting backflow within the system. 6 is appendix loop section between 7 and pump unit, wherein said loop section is meant to be used to in turn wrap around the receiver, that is input connection stem of the supply, that is primary feed fluid supply receiver stem to be subsequently also wrapped up with insulating material as in 4. 5 is appendix loop section between 7 and 12, wherein this loop section is meant to be used to in turn wrap around the primary feed fluid supply input terminal stem to be subsequently also wrapped with insulating material as in 4. 14 is bracket affixing pump to one of the terminal couplings 3. 17 is thermocouple thermostat unit which if temperature of returning antifreeze in 12 drops below a predetermined and desired degree, will trigger a switching relay unit which supplies current to electric pump 2 and heating element 8. 18 are electric terminals for trigger switching mechanism to activate pump 2.

What I claim as new and desire to secure by Letters Patent of the United States of America is:

1. A flexible primary liquid transfer hose unit at each end equipped with suitable couplings, wherein said transfer hose has affixed along its side two antifreeze hoses, wherein one constitutes a supply line, and the other of said two hoses a return line each hose at each end terminating in an overlap appendix loop hose connection joining aforesaid respective supply and return hose ends at each respective end of the primary liquid transfer hose unit, wherein also at suitable locations built into the thusly existing antifreeze hose closed circuit system are an electric waterpump, a thermostat relay unit which upon a drop of antifreeze temperature below a predetermined degree causes aforesaid waterpump to be switched on in phased sequence, furtherwherein also built into aforementioned antifreeze closed circuit system at suitable locations are an antifreeze heater unit, a pressure relief valve, a means to refill and top off such antifreeze closed circuit system together with adequate electric wiring system, furtherwherein also aforesaid primary liquid transfer hose unit together with its thereto attached antifreeze hoses is packed in and surrounded with adequate insulation for the purpose of keeping the primary transfer liquid from becoming unmanageable due to the effect of freezing weather, also wherein further aforementioned overlap appendix antifreeze hose loop sections together with added insulating material are usuable for freeze protection of both primary liquid main supply pipe stem and primary liquid receiver pipe stem, whereinfurther the operation of said freeze protection system functions by pumping heated antifreeze liquid through the antifreeze closed circuit in conjunction with the controlled temperature means of the antifreeze pump and heating system.

* * * * *